United States Patent
Calderon, Jr.

(10) Patent No.: US 10,967,795 B1
(45) Date of Patent: Apr. 6, 2021

(54) SIDE VIEW MIRROR FOR AUTOMOBILE

(71) Applicant: Abel Calderon, Jr., Los Angeles, CA (US)

(72) Inventor: Abel Calderon, Jr., Los Angeles, CA (US)

( * ) Notice: Subject to any disclaimer, the term of this patent is extended or adjusted under 35 U.S.C. 154(b) by 138 days.

(21) Appl. No.: 14/705,973

(22) Filed: May 7, 2015

(51) Int. Cl.
- *G02B 5/10* (2006.01)
- *G02B 5/08* (2006.01)
- *B60R 1/08* (2006.01)
- *G02B 27/00* (2006.01)

(52) U.S. Cl.
CPC .......... *B60R 1/081* (2013.01); *G02B 27/0025* (2013.01)

(58) Field of Classification Search
CPC ..... B60R 1/081; B60R 1/088; G02B 27/0025; G02F 1/155; G02F 1/1523; G02F 1/1525; G02F 1/1521; G02F 1/163; G02F 1/1533; G02F 1/03; G02F 1/0316; G02F 3/16; C09K 9/02; H04N 9/3137; H04N 9/22
USPC ........ 359/864, 265–275, 277, 245–247, 254, 359/242; 345/49, 105, 107; 248/817; 438/929
See application file for complete search history.

(56) References Cited

U.S. PATENT DOCUMENTS

| | | | |
|---|---|---|---|
| 3,338,655 A | 8/1967 | Young | |
| 3,408,136 A | 10/1968 | Travis | |
| 3,764,201 A * | 10/1973 | Haile | B60R 1/082 359/864 |
| 6,069,755 A | 5/2000 | Li | |
| 6,199,993 B1 | 3/2001 | Mou | |
| 8,128,244 B2 | 3/2012 | Lynam | |
| 8,267,535 B2 | 9/2012 | Zhao | |
| 8,736,940 B2 | 5/2014 | Rawlings | |
| 2003/0081334 A1 | 5/2003 | Skinner | |
| 2003/0169521 A1* | 9/2003 | Hoegh | B60R 1/082 359/864 |
| 2004/0212489 A1* | 10/2004 | Chan | B60Q 1/2665 340/475 |
| 2005/0180034 A1* | 8/2005 | Schmidt | B60R 1/08 359/853 |
| 2011/0317241 A1* | 12/2011 | Cammenga | B60R 1/072 359/266 |

* cited by examiner

*Primary Examiner* — Dawayne Pinkney
(74) *Attorney, Agent, or Firm* — Law Office of Michael O'Brien; Michael O'Brien

(57) ABSTRACT

A side view mirror for an automobile is configured to maximize viewing area and minimize image distortion. The side view mirror has a flat portion, having a flat portion major axis, a flat portion minor axis and a convex portion height. A convex portion is smoothly joined to the flat portion and having a convex portion major axis, a convex portion minor axis, a convex portion height; wherein the convex portion is configured to be defined around an origin point.

9 Claims, 6 Drawing Sheets

SIDE VIEW MIRROR FOR AUTOMOBILE

BACKGROUND

The embodiments herein relate generally to mirrors on automobiles. The challenge in mirrors on automobiles is to maximize viewing area while minimizing distortion. There is no shortage of endeavors in this regard, including: U.S. Pat. No. 3,408,136 issued to Travis; U.S. Pat. No. 6,069,755 issued to Li; U.S. Pat. No. 3,338,655 issued to Young; Published U.S. Application 2003/0081334 filed by Skinner; U.S. Pat. No. 6,199,993 issued to Mou; U.S. Pat. No. 8,128,244 issued to Lynam; U.S. Pat. No. 8,267,535 issued to Zhao; and U.S. Pat. No. 8,736,940 issued to Rawlings.

Travis and Skinner teach a rear view mirror with flat and convex elements. The convex portion is a rectangular convex shape (that is, a bent rectangle). Young uses a circular convex shape instead of a rectangle. Lynam and Rawlings add reflective portions to this mirror arrangement.

Mou and Zhao teach the familiar arrangement of having a small convex portion within an otherwise flat mirror. The present invention teaches away from this by having the round portion extend past the mirror in a number of places.

Li teaches a convex shape comprising numerous distinctive curved surfaces having a widely varying average curvature. In that regard, Li chooses average over Gaussian curvature as a design constraint.

Embodiments of the disclosed invention use a larger convex portion, defined by a different function, and measured by a different standard of consistency. In this regard, embodiments of the present invention offer an entirely unique way of solving this classical problem.

SUMMARY

A side view mirror for an automobile is configured to maximize viewing area and minimize image distortion. The side view mirror has a flat portion, having a flat portion major axis, a flat portion minor axis and a convex portion height. A convex portion is smoothly joined to the flat portion and having a convex portion major axis, a convex portion minor axis, a convex portion height; wherein the convex portion is configured to be defined around an origin point.

In some embodiments, every point on the convex portion has a Gaussian curvature that is greater than zero. In some embodiments, the convex portion has some points with a Gaussian curvature that is greater than zero and some points with the Gaussian curvature that is less than zero causing a saddling effect on the convex portion.

In some embodiments, the convex portion height can be greater than zero. The convex portion major axis can be greater than twice the convex portion minor axis plus the convex portion height. The flat portion minor axis can be greater than three quarters the flat portion major axis. The flat portion major axis can be greater than the convex portion minor axis.

The convex portion can be defined by an ellipsoid equation:

$$\frac{z^2}{c^2} + \frac{(x-F)^2}{a^2} + \frac{y^2}{b^2} = 1$$

where a is half the convex portion minor axis; b is half the convex portion major axis and c is the convex portion height.

In some embodiments, F can be equal to zero. In some embodiments, F can be equal to the convex portion height.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 5:
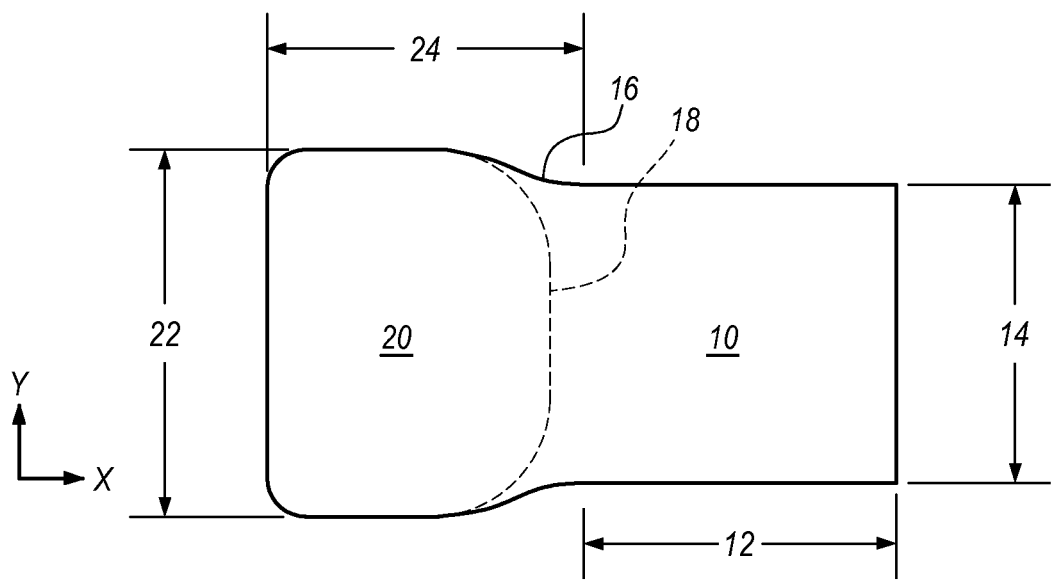
FIG. 5 shows a front view of one embodiment of the present invention.
Figure 6:
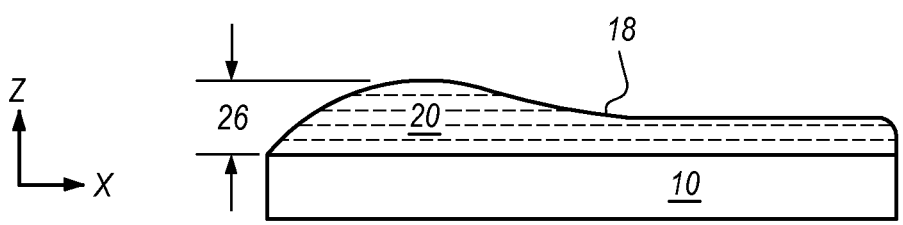
FIG. 6 shows a top view of one embodiment of the present invention.
Figure 7:
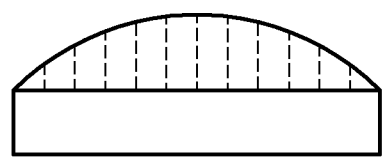
FIG. 7 shows a side view of one embodiment of the present invention.

By way of example, and referring to FIG. 5 and FIG. 6, one embodiment of the side view mirror comprises flat portion 10 joined to convex portion 20. The flat portion 10 has a flat portion minor axis 12 and a flat portion major axis 14. The area could simply be described as:

$$\int_0^x E \, dy \qquad \text{eqn.1}$$

In equation 1, E is the flat portion major axis 14 which extends along the y-axis. In some embodiments, there is flat portion 10 extends in a manner not described by equation 1 but shown in FIG. 1, FIG. 2 and FIG. 5 with transition portion 16 that provides structural support for convex portion 20. In either case, convex portion 20 extends beyond the y-axis dimension of flat portion 10. The x-axis, the y-axis and the z-axis are labeled for clarity and consistency throughout the specification. However, those of ordinary skill would recognize this labeling as arbitrary and any axis could have any label. In some embodiments, as discussed in more detail below, it may be useful to have saddling transition 18 that transitions from convex portion 20 to flat portion 10.

There is also the convex portion 20 which has a convex portion major axis 22, a convex portion minor axis 24, a convex portion height 26 and an origin point 28, which is provided for reference. Convex portion 20 has its geometric underpinnings in an ellipsoid equation which can be defined by equation 2.

$$\frac{z^2}{c^2} + \frac{x^2}{b^2} + \frac{y^2}{a^2} = 1 \qquad \text{eqn. 2}$$

Here, 2*a is convex portion major axis 22, 2*b is convex portion minor axis 24 and c is convex portion height 26. In some embodiments, this may serve as an adequate model to design convex surface 20. However, in other models, as shown in FIG. 6, convex portion 20 tapers into flat portion 10. This is accomplished with equation 3.

$$\frac{z^2}{c^2} + \frac{\left(x\frac{c}{10}\right)^2}{b^2} + \frac{y^2}{a^2} = 1 \qquad \text{eqn. 3}$$

The present disclosure explains that Gaussian curvature is what ultimately maximize viewing area while minimizing distortion. Gaussian curvature of equation 2 is defined as:

$$K = \left(\frac{z^2}{c^4} + \frac{x^2}{a^4} + \frac{y^2}{b^4}\right)^{-2} * (a^2 * b^2 * c^2)^{-1} \qquad \text{eqn. 4}$$

The Gaussian curvature for Equation 3 is a little more elaborate:

$$K = \frac{\left(\frac{8z^2}{a^2c^4} + \frac{8z\left(x\frac{c}{10}\right)^2}{c^2a^4}\right) * \left(\frac{8z^2}{b^2c^4} + \frac{8zy^2}{c^2b^4}\right) \frac{64y^2\left(x\frac{c}{10}\right)^2}{a^4b^4c^4}}{\frac{4\left(x\frac{c}{10}\right)^2}{a^4} * \left(\frac{4\left(x-\frac{c}{10}\right)^2}{a^4} + \frac{4y^2}{b^4} + \frac{4z^2}{c^4}\right)^2} \qquad \text{eqn. 5}$$

The current invention proposes that one can maximize viewing area while minimizing distortion when a, b, and c are within certain ranges. Two more variables are needed here: the flat portion minor axis 12 is d and the flat portion major axis 14 is e. The following conditions are presented:

$c > 0$      cond. 1

$a > b + c$      cond. 2

$d > 1.5*a$      cond. 3

$2*b > e$      cond. 4

There are some preferred ranges:

$2.125*b < e < 2.375*b$      range 1

$1.75*a < d < 2.25*a$      range 2

$1.5*a < b < 2.0*a$      range 3

With those conditions we can now proceed to some examples:

Example 1

Here, the flat portion minor axis 12 is 3.75 inches, the flat portion major axis 14 is 4.00 inches, the convex portion major axis 22 is 4.50 inches, the convex portion minor axis 24 is 2.75 inches, and the convex portion height 26 is 0.500 inches.

Figure 2:
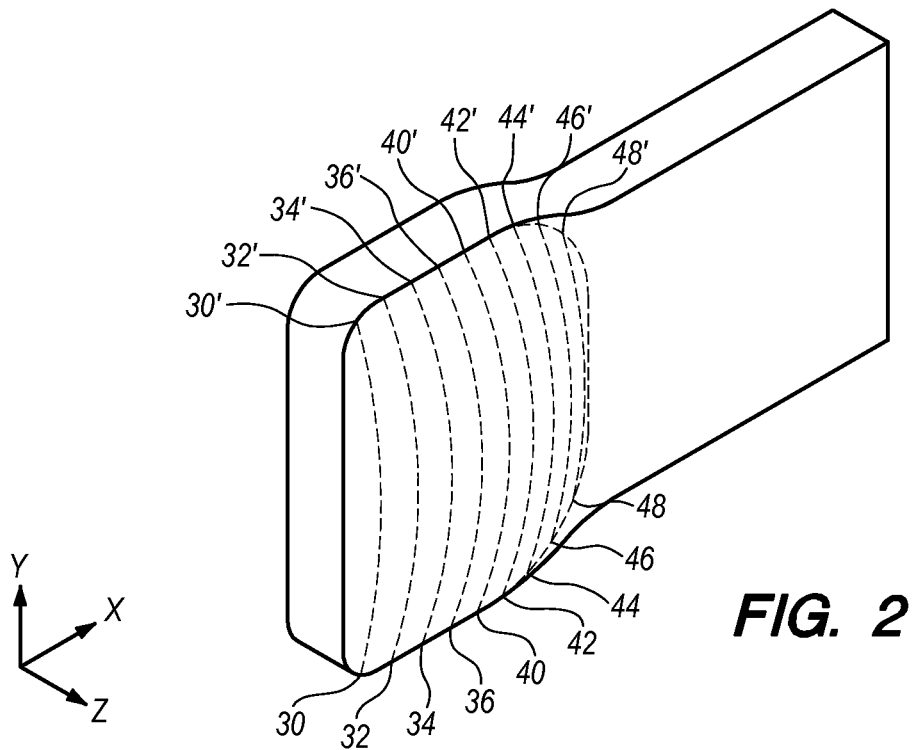
FIG. 2 shows a perspective view of one embodiment of the present invention.
Figure 3:
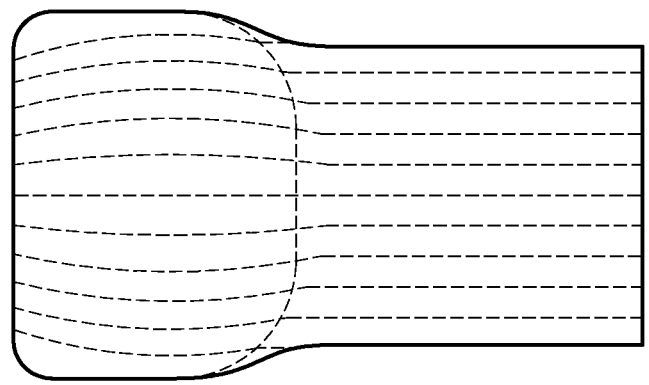
FIG. 3 shows a front view of one embodiment of the present invention.
Figure 4:
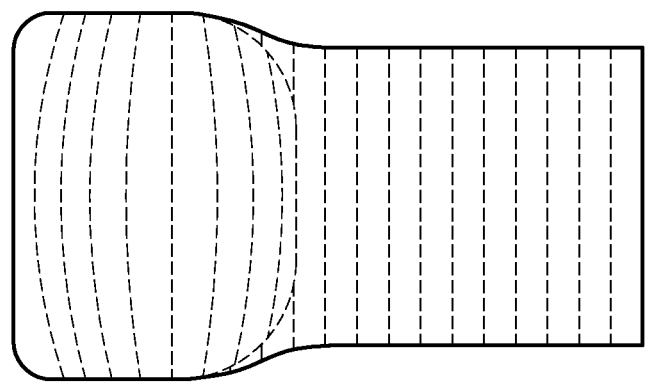
FIG. 4 shows a front view of one embodiment of the present invention.

In this example a=1.375 inches, b=2.25 inches and c=0.5 inches d=3.75 inches and e=4.0 inches. In this model, equation 1 is utilized to define the convex portion 20. To show how the convex portion 20 changes with respect to height even measurements are made at regular intervals in the table below as shown:

| Chord (as shown in FIG. 2) | x | y | z | Gaussian curvature |
|---|---|---|---|---|
| 40-40' | 0 | -2.25 | 0 | 3.55803 |
| 40-40' | 0 | -1.8 | 0.3 | 0.05658 |
| 40-40' | 0 | -1.35 | 0.4 | 0.02005 |
| 40-40' | 0 | -0.9 | 0.45826 | 0.01207 |
| 40-40' | 0 | -0.45 | 0.4899 | 0.00938 |
| 40-40' | 0 | 0 | 0.5 | 0.00868 |
| 40-40' | 0 | 0.45 | 0.4899 | 0.00938 |
| 40-40' | 0 | 0.9 | 0.45826 | 0.01207 |
| 40-40' | 0 | 1.35 | 0.4 | 0.02005 |
| 40-40' | 0 | 1.8 | 0.3 | 0.05658 |
| 40-40' | 0 | 2.25 | 0 | 3.55803 |
| 30-30' | -1.1 | -1.35 | 0 | 0.82739 |
| 30-30' | -1.1 | -0.9 | 0.22361 | 0.1014 |
| 30-30' | -1.1 | -0.45 | 0.28284 | 0.05248 |
| 30-30' | -1.1 | 0 | 0.3 | 0.04389 |
| 30-30' | -1.1 | 0.45 | 0.28284 | 0.05248 |
| 30-30' | -1.1 | 0.9 | 0.22361 | 0.1014 |
| 30-30' | -1.1 | 1.35 | 0 | 0.82739 |
| 32-32' | -0.825 | -1.35 | 0.26458 | 0.07274 |
| 32-32' | -0.825 | -0.9 | 0.34641 | 0.03026 |
| 32-32' | -0.825 | -0.45 | 0.3873 | 0.02056 |
| 32-32' | -0.825 | 0 | 0.4 | 0.01835 |
| 32-32' | -0.825 | 0.45 | 0.3873 | 0.02056 |
| 32-32' | -0.825 | 0.9 | 0.34641 | 0.03026 |
| 32-32' | -0.825 | 1.35 | 0.26458 | 0.07274 |
| 34-34' | -0.55 | -1.8 | 0.22361 | 0.13581 |
| 34-34' | -0.55 | -1.35 | 0.34641 | 0.03222 |
| 34-34' | -0.55 | -0.9 | 0.41231 | 0.01726 |
| 34-34' | -0.55 | -0.45 | 0.44721 | 0.01281 |
| 34-34' | -0.55 | 0 | 0.45826 | 0.0117 |
| 34-34' | -0.55 | 0.45 | 0.44721 | 0.01281 |
| 34-34' | -0.55 | 0.9 | 0.41231 | 0.01726 |
| 34-34' | -0.55 | 1.35 | 0.34641 | 0.03222 |
| 34-34' | -0.55 | 1.8 | 0.22361 | 0.13581 |
| 36-36' | -0.275 | -1.8 | 0.28284 | 0.06812 |
| 36-36' | -0.275 | -1.35 | 0.3873 | 0.02235 |
| 36-36' | -0.275 | -0.9 | 0.44721 | 0.01312 |
| 36-36' | -0.275 | -0.45 | 0.47958 | 0.01009 |
| 36-36' | -0.275 | 0 | 0.4899 | 0.00931 |
| 36-36' | -0.275 | 0.45 | 0.47958 | 0.01009 |
| 36-36' | -0.275 | 0.9 | 0.44721 | 0.01312 |
| 36-36' | -0.275 | 1.35 | 0.3873 | 0.02235 |
| 36-36' | -0.275 | 1.8 | 0.28284 | 0.06812 |
| 42-42' | 0.275 | -1.8 | 0.28284 | 0.06812 |
| 42-42' | 0.275 | -1.35 | 0.3873 | 0.02235 |
| 42-42' | 0.275 | -0.9 | 0.44721 | 0.01312 |
| 42-42' | 0.275 | -0.45 | 0.47958 | 0.01009 |
| 42-42' | 0.275 | 0 | 0.4899 | 0.00931 |
| 42-42' | 0.275 | 0.45 | 0.47958 | 0.01009 |
| 42-42' | 0.275 | 0.9 | 0.44721 | 0.01312 |
| 42-42' | 0.275 | 1.35 | 0.3873 | 0.02235 |
| 42-42' | 0.275 | 1.8 | 0.28284 | 0.06812 |
| 44-44' | 0.55 | -1.8 | 0.22361 | 0.13581 |
| 44-44' | 0.55 | -1.35 | 0.34641 | 0.03222 |
| 44-44' | 0.55 | -0.9 | 0.41231 | 0.01726 |
| 44-44' | 0.55 | -0.45 | 0.44721 | 0.01281 |
| 44-44' | 0.55 | 0 | 0.45826 | 0.0117 |
| 44-44' | 0.55 | 0.45 | 0.44721 | 0.01281 |
| 44-44' | 0.55 | 0.9 | 0.41231 | 0.01726 |
| 44-44' | 0.55 | 1.35 | 0.34641 | 0.03222 |
| 44-44' | 0.55 | 1.8 | 0.22361 | 0.13581 |
| 46-46' | 1.1 | -1.35 | 0 | 0.82739 |
| 46-46' | 1.1 | -0.9 | 0.22361 | 0.1014 |
| 46-46' | 1.1 | -0.45 | 0.28284 | 0.05248 |
| 46-46' | 1.1 | 0 | 0.3 | 0.04389 |
| 46-46' | 1.1 | 0.45 | 0.28284 | 0.05248 |

-continued

| Chord (as shown in FIG. 2) | x | y | z | Gaussian curvature |
|---|---|---|---|---|
| 46-46' | 1.1 | 0.9 | 0.22361 | 0.1014 |
| 46-46' | 1.1 | 1.35 | 0 | 0.82739 |

Figure 1:
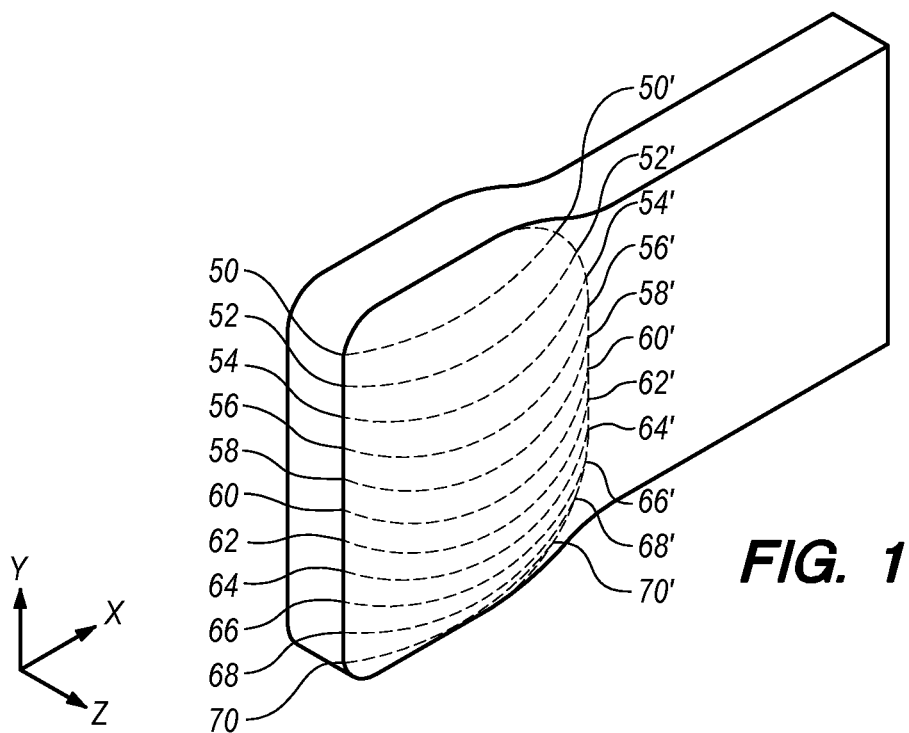
FIG. 1 shows a perspective view of one embodiment of the present invention.

Likewise, measurements can be taken in regular intervals in the x-direction with chords as shown in FIG. 1:

| chord (as shown in FIG. 1) | x | y | z | Gaussian curvature |
|---|---|---|---|---|
| 52-52' | −0.825 | 1.8 | 0 | 1.382987627 |
| 52-52' | −0.55 | 1.8 | 0.223606798 | 0.135811213 |
| 52-52' | −0.275 | 1.8 | 0.282842712 | 0.068120856 |
| 52-52' | 0 | 1.8 | 0.3 | 0.056579974 |
| 52-52' | 0.275 | 1.8 | 0.282842712 | 0.068120856 |
| 52-52' | 0.55 | 1.8 | 0.223606798 | 0.135811213 |
| 52-52' | 0.825 | 1.8 | 0 | 1.382987627 |
| 54-54' | −1.1 | 1.35 | 0 | 0.827388164 |
| 54-54' | −0.825 | 1.35 | 0.264575131 | 0.072738103 |
| 54-54' | −0.55 | 1.35 | 0.346410162 | 0.032220589 |
| 54-54' | −0.275 | 1.35 | 0.387298335 | 0.022350617 |
| 54-54' | 0 | 1.35 | 0.4 | 0.020053984 |
| 54-54' | 0.275 | 1.35 | 0.387298335 | 0.022350617 |
| 54-54' | 0.55 | 1.35 | 0.346410162 | 0.032220589 |
| 54-54' | 0.825 | 1.35 | 0.264575131 | 0.072738103 |
| 54-54' | 1.1 | 1.35 | 0 | 0.827388164 |
| 56-56' | −1.1 | 0.9 | 0.223606798 | 0.10139586 |
| 56-56' | −0.825 | 0.9 | 0.346410162 | 0.03025748 |
| 56-56' | −0.55 | 0.9 | 0.412310563 | 0.017258189 |
| 56-56' | −0.275 | 0.9 | 0.447213595 | 0.013121228 |
| 56-56' | 0 | 0.9 | 0.458257569 | 0.012068923 |
| 56-56' | 0.275 | 0.9 | 0.447213595 | 0.013121228 |
| 56-56' | 0.55 | 0.9 | 0.412310563 | 0.017258189 |
| 56-56' | 0.825 | 0.9 | 0.346410162 | 0.03025748 |
| 56-56' | 1.1 | 0.9 | 0.223606798 | 0.10139586 |
| 58-58' | −1.1 | 0.45 | 0.282842712 | 0.052482805 |
| 58-58' | −0.825 | 0.45 | 0.387298335 | 0.020563433 |
| 58-58' | −0.55 | 0.45 | 0.447213595 | 0.012806184 |
| 58-58' | −0.275 | 0.45 | 0.479583152 | 0.010091407 |
| 58-58' | 0 | 0.45 | 0.489897949 | 0.009376294 |
| 58-58' | 0.275 | 0.45 | 0.479583152 | 0.010091407 |
| 58-58' | 0.55 | 0.45 | 0.447213595 | 0.012806184 |
| 58-58' | 0.825 | 0.45 | 0.387298335 | 0.020563433 |
| 58-58' | 1.1 | 0.45 | 0.282842712 | 0.052482805 |
| 60-60' | −1.375 | 0 | 0 | 0.496237798 |
| 60-60' | −1.1 | 0 | 0.3 | 0.043889967 |
| 60-60' | −0.825 | 0 | 0.4 | 0.01835199 |
| 60-60' | −0.55 | 0 | 0.458257569 | 0.011700229 |
| 60-60' | −0.275 | 0 | 0.489897949 | 0.009312025 |
| 60-60' | 0 | 0 | 0.5 | 0.00867679 |
| 60-60' | 0.275 | 0 | 0.489897949 | 0.009312025 |
| 60-60' | 0.55 | 0 | 0.458257569 | 0.011700229 |
| 60-60' | 0.825 | 0 | 0.4 | 0.01835199 |
| 60-60' | 1.1 | 0 | 0.3 | 0.043889967 |
| 60-60' | 1.375 | 0 | 0 | 0.496237798 |
| 62-62' | −1.1 | −0.45 | 0.282842712 | 0.052482805 |
| 62-62' | −0.825 | −0.45 | 0.387298335 | 0.020563433 |
| 62-62' | −0.55 | −0.45 | 0.447213595 | 0.012806184 |
| 62-62' | −0.275 | −0.45 | 0.479583152 | 0.010091407 |
| 62-62' | 0 | −0.45 | 0.489897949 | 0.009376294 |
| 62-62' | 0.275 | −0.45 | 0.479583152 | 0.010091407 |
| 62-62' | 0.55 | −0.45 | 0.447213595 | 0.012806184 |
| 62-62' | 0.825 | −0.45 | 0.387298335 | 0.020563433 |
| 62-62' | 1.1 | −0.45 | 0.282842712 | 0.052482805 |
| 64-64' | −1.1 | −0.9 | 0.223606798 | 0.10139586 |
| 64-64' | −0.825 | −0.9 | 0.346410162 | 0.03025748 |
| 64-64' | −0.55 | −0.9 | 0.412310563 | 0.017258189 |
| 64-64' | −0.275 | −0.9 | 0.447213595 | 0.013121228 |
| 64-64' | 0 | −0.9 | 0.458257569 | 0.012068923 |
| 64-64' | 0.275 | −0.9 | 0.447213595 | 0.013121228 |
| 64-64' | 0.55 | −0.9 | 0.412310563 | 0.017258189 |
| 64-64' | 0.825 | −0.9 | 0.346410162 | 0.03025748 |
| 64-64' | 1.1 | −0.9 | 0.223606798 | 0.10139586 |
| 66-66' | −1.1 | −1.35 | 0 | 0.827388164 |
| 66-66' | −0.825 | −1.35 | 0.264575131 | 0.072738103 |
| 66-66' | −0.55 | −1.35 | 0.346410162 | 0.032220589 |
| 66-66' | −0.275 | −1.35 | 0.387298335 | 0.022350617 |
| 66-66' | 0 | −1.35 | 0.4 | 0.020053984 |
| 66-66' | 0.275 | −1.35 | 0.387298335 | 0.022350617 |
| 66-66' | 0.55 | −1.35 | 0.346410162 | 0.032220589 |
| 66-66' | 0.825 | −1.35 | 0.264575131 | 0.072738103 |
| 66-66' | 1.1 | −1.35 | 0 | 0.827388164 |
| 68-68' | −0.825 | −1.8 | 0 | 1.382987627 |
| 68-68' | −0.55 | −1.8 | 0.223606798 | 0.135811213 |
| 68-68' | −0.275 | −1.8 | 0.282842712 | 0.068120856 |
| 68-68' | 0 | −1.8 | 0.3 | 0.056579974 |
| 68-68' | 0.275 | −1.8 | 0.282842712 | 0.068120856 |
| 68-68' | 0.55 | −1.8 | 0.223606798 | 0.135811213 |
| 68-68' | 0.825 | −1.8 | 0 | 1.382987627 |

Example 2

Here, the flat portion minor axis 12 is 3.75 inches, the flat portion major axis 14 is 4.00 inches, the convex portion major axis 22 is 4.50 inches, the convex portion minor axis 24 is 2.75 inches, and the convex portion height 26 is 0.500 inches.

In this example a=1.375 inches, b=2.25 inches and c=0.5 inches d=3.75 inches and e=4.0 inches. In this model, equation 2 is utilized to define the convex portion 20. Equation 1 and Equation 2 are almost identical except that Equation 2 uses a major axis offset to cause a saddling effect around the edges. This saddling accomplishes the same effect as the blocking portions between the round and flat mirrors in some of the previous endeavors in this field. However, the saddling provides improved viewing portions when used sparingly. While the saddling may not appear to the naked eye, it can be proven to exist mathematically by showing points of negative Gaussian curvature, To show how the convex portion 20 changes with respect to height even measurements are made at regular intervals in the table below as shown:

| chord (as shown in FIG. 2) | x | y | z | Gaussian curvature |
|---|---|---|---|---|
| 40-40' | 0 | −1.8 | 0.28458 | 0.52620751 |
| 40-40' | 0 | −1.35 | 0.39142 | 0.480120367 |
| 40-40' | 0 | −0.9 | 0.45325 | 0.444339799 |
| 40-40' | 0 | −0.45 | 0.4875 | 0.424306522 |
| 40-40' | 0 | 0 | 0.49988 | 0.417900438 |
| 40-40' | 0 | 0.45 | 0.49204 | 0.42427035 |
| 40-40' | 0 | 0.9 | 0.46295 | 0.444014984 |
| 40-40' | 0 | 1.35 | 0.4081 | 0.479012729 |
| 40-40' | 0 | 1.8 | 0.31427 | 0.527410045 |
| 40-40' | 0 | 2.25 | 0.10482 | 0.265349622 |
| 30-30' | −1.1 | −0.9 | 0.21315 | −1.653567582 |
| 30-30' | −1.1 | −0.45 | 0.27867 | −0.129549705 |
| 30-30' | −1.1 | 0 | 0.29979 | 0.288454206 |
| 30-30' | −1.1 | 0.45 | 0.28653 | −0.111272336 |
| 30-30' | −1.1 | 0.9 | 0.23307 | −1.549058982 |
| 30-30' | −1.1 | 1.35 | 0.08089 | −2.775863278 |
| 32-32' | −0.825 | −1.35 | 0.25142 | −2.206749161 |
| 32-32' | −0.825 | −0.9 | 0.33975 | −0.437186309 |
| 32-32' | −0.825 | −0.45 | 0.38426 | 0.211374679 |
| 32-32' | −0.825 | 0 | 0.39985 | 0.384254756 |
| 32-32' | −0.825 | 0.45 | 0.39 | 0.217648257 |
| 32-32' | −0.825 | 0.9 | 0.35259 | −0.387426547 |
| 32-32' | −0.825 | 1.35 | 0.27666 | −1.939398707 |
| 34-34' | −0.55 | −1.8 | 0.20245 | −2.475759875 |
| 34-34' | −0.55 | −1.35 | 0.33647 | −0.466618021 |

| chord (as shown in FIG. 2) | x | y | z | Gaussian curvature |
|---|---|---|---|---|
| 34-34' | −0.55 | −0.9 | 0.40673 | 0.125827295 |
| 34-34' | −0.55 | −0.45 | 0.44458 | 0.349791844 |
| 34-34' | −0.55 | 0 | 0.45812 | 0.410604902 |
| 34-34' | −0.55 | 0.45 | 0.44955 | 0.351734319 |
| 34-34' | −0.55 | 0.9 | 0.41752 | 0.141278052 |
| 34-34' | −0.55 | 1.35 | 0.35573 | −0.382493622 |
| 34-34' | −0.55 | 1.8 | 0.24242 | −1.955687764 |
| 36-36' | −0.275 | −1.8 | 0.26644 | −0.172494312 |
| 36-36' | −0.275 | −1.35 | 0.37843 | 0.249697768 |
| 36-36' | −0.275 | −0.9 | 0.44208 | 0.365195604 |
| 36-36' | −0.275 | −0.45 | 0.47713 | 0.406216834 |
| 36-36' | −0.275 | 0 | 0.48977 | 0.416896363 |
| 36-36' | −0.275 | 0.45 | 0.48177 | 0.406633112 |
| 36-36' | −0.275 | 0.9 | 0.45202 | 0.368468992 |
| 36-36' | −0.275 | 1.35 | 0.39566 | 0.267351038 |
| 36-36' | −0.275 | 1.8 | 0.29794 | −0.057297425 |
| 42-42' | 0.275 | −1.8 | 0.26644 | 0.19213789 |
| 42-42' | 0.275 | −1.35 | 0.37843 | 0.372305835 |
| 42-42' | 0.275 | −0.9 | 0.44208 | 0.407507387 |
| 42-42' | 0.275 | −0.45 | 0.47713 | 0.415910916 |
| 42-42' | 0.275 | 0 | 0.48977 | 0.417444134 |
| 42-42' | 0.275 | 0.45 | 0.48177 | 0.416087067 |
| 42-42' | 0.275 | 0.9 | 0.45202 | 0.408877629 |
| 42-42' | 0.275 | 1.35 | 0.39566 | 0.380141046 |
| 42-42' | 0.275 | 1.8 | 0.29794 | 0.25021181 |
| 44-44' | 0.55 | −1.8 | 0.20245 | −1.70812945 |
| 44-44' | 0.55 | −1.35 | 0.33647 | −0.188433507 |
| 44-44' | 0.55 | −0.9 | 0.40673 | 0.222078134 |
| 44-44' | 0.55 | −0.45 | 0.44458 | 0.372612003 |
| 44-44' | 0.55 | 0 | 0.45812 | 0.412952823 |
| 44-44' | 0.55 | 0.45 | 0.44955 | 0.373978671 |
| 44-44' | 0.55 | 0.9 | 0.41752 | 0.233057174 |
| 44-44' | 0.55 | 1.35 | 0.35573 | −0.126909397 |
| 44-44' | 0.55 | 1.8 | 0.24242 | −1.278681108 |
| 46-46' | 0.825 | −1.35 | 0.25142 | −1.760534085 |
| 46-46' | 0.825 | −0.9 | 0.33975 | −0.26736236 |
| 46-46' | 0.825 | −0.45 | 0.38426 | 0.254324499 |
| 46-46' | 0.825 | 0 | 0.39985 | 0.391345625 |
| 46-46' | 0.825 | 0.45 | 0.39 | 0.259539263 |
| 46-46' | 0.825 | 0.9 | 0.35259 | −0.224906013 |
| 46-46' | 0.825 | 1.35 | 0.27666 | −1.513868226 |
| 46-46' | 0.825 | 1.8 | 0.09362 | −3.991501489 |
| 48-48' | 1.1 | −0.9 | 0.21315 | −1.474768458 |
| 48-48' | 1.1 | −0.45 | 0.27867 | −0.066270018 |
| 48-48' | 1.1 | 0 | 0.29979 | 0.304188248 |
| 48-48' | 1.1 | 0.45 | 0.28653 | −0.048449857 |
| 48-48' | 1.1 | 0.9 | 0.23307 | −1.35829632 |
| 48-48' | 1.1 | 1.35 | 0.08089 | −2.730133507 |

Likewise, measurements can be taken in regular intervals in the x-direction with chords as shown in FIG. 1:

| chord (as shown in FIG. 1) | x | y | z | Gaussian curvature |
|---|---|---|---|---|
| 52-52' | −0.825 | 1.8 | 0.09362 | −4.334908083 |
| 52-52' | −0.55 | 1.8 | 0.24242 | −1.955687764 |
| 52-52' | −0.275 | 1.8 | 0.29794 | −0.057297425 |
| 52-52' | 0 | 1.8 | 0.31427 | 0.527410045 |
| 52-52' | 0.275 | 1.8 | 0.29794 | 0.25021181 |
| 52-52' | 0.55 | 1.8 | 0.24242 | −1.278681108 |
| 52-52' | 0.825 | 1.8 | 0.09362 | −3.991501489 |
| 54-54' | −1.1 | 1.35 | 0.08089 | −2.775863278 |
| 54-54' | −0.825 | 1.35 | 0.27666 | −1.939398707 |
| 54-54' | −0.55 | 1.35 | 0.35573 | −0.382493622 |
| 54-54' | −0.275 | 1.35 | 0.39566 | 0.267351038 |
| 54-54' | 0 | 1.35 | 0.4081 | 0.479012729 |
| 54-54' | 0.275 | 1.35 | 0.39566 | 0.380141046 |
| 54-54' | 0.55 | 1.35 | 0.35573 | −0.126909397 |
| 54-54' | 0.825 | 1.35 | 0.27666 | −1.513868226 |
| 54-54' | 1.1 | 1.35 | 0.08089 | −2.730133507 |
| 56-56' | −1.1 | 0.9 | 0.23307 | −1.549058982 |
| 56-56' | −0.825 | 0.9 | 0.35259 | −0.387426547 |
| 56-56' | −0.55 | 0.9 | 0.41752 | 0.141278052 |
| 56-56' | −0.275 | 0.9 | 0.45202 | 0.368468992 |
| 56-56' | 0 | 0.9 | 0.46295 | 0.444014984 |
| 56-56' | 0.275 | 0.9 | 0.45202 | 0.408877629 |
| 56-56' | 0.55 | 0.9 | 0.41752 | 0.233057174 |
| 56-56' | 0.825 | 0.9 | 0.35259 | −0.224906013 |
| 56-56' | 1.1 | 0.9 | 0.23307 | −1.35829632 |
| 58-58' | −1.1 | 0.45 | 0.28653 | −0.111272336 |
| 58-58' | −0.825 | 0.45 | 0.39 | 0.217648257 |
| 58-58' | −0.55 | 0.45 | 0.44955 | 0.351734319 |
| 58-58' | −0.275 | 0.45 | 0.48177 | 0.406633112 |
| 58-58' | 0 | 0.45 | 0.49204 | 0.42427035 |
| 58-58' | 0.275 | 0.45 | 0.48177 | 0.416087067 |
| 58-58' | 0.55 | 0.45 | 0.44955 | 0.373978671 |
| 58-58' | 0.825 | 0.45 | 0.39 | 0.259539263 |
| 58-58' | 1.1 | 0.45 | 0.28653 | −0.048449857 |
| 60-60' | −1.35 | 0 | 0.09426 | 0.020634236 |
| 60-60' | −1.1 | 0 | 0.29979 | 0.288454206 |
| 60-60' | −0.825 | 0 | 0.39985 | 0.384254756 |
| 60-60' | −0.55 | 0 | 0.45812 | 0.410604902 |
| 60-60' | −0.275 | 0 | 0.48977 | 0.416896363 |
| 60-60' | 0 | 0 | 0.49988 | 0.417900438 |
| 60-60' | 0.275 | 0 | 0.48977 | 0.417444134 |
| 60-60' | 0.55 | 0 | 0.45812 | 0.412952823 |
| 60-60' | 0.825 | 0 | 0.39985 | 0.391345625 |
| 60-60' | 1.1 | 0 | 0.29979 | 0.304188248 |
| 60-60' | 1.35 | 0 | 0.09426 | 0.0240602 |
| 62-62' | −1.1 | −0.45 | 0.27867 | −0.129549707 |
| 62-62' | −0.825 | −0.45 | 0.38426 | 0.211374679 |
| 62-62' | −0.55 | −0.45 | 0.44458 | 0.349791844 |
| 62-62' | −0.275 | −0.45 | 0.47713 | 0.406216834 |
| 62-62' | 0 | −0.45 | 0.4875 | 0.424306522 |
| 62-62' | 0.275 | −0.45 | 0.47713 | 0.415910916 |
| 62-62' | 0.55 | −0.45 | 0.44458 | 0.372612003 |
| 62-62' | 0.825 | −0.45 | 0.38426 | 0.254324499 |
| 62-62' | 1.1 | −0.45 | 0.27867 | −0.066270018 |
| 64-64' | −1.1 | −0.9 | 0.21315 | −1.653567582 |
| 64-64' | −0.825 | −0.9 | 0.33975 | −0.437186309 |
| 64-64' | −0.55 | −0.9 | 0.40673 | 0.125827295 |
| 64-64' | −0.275 | −0.9 | 0.44208 | 0.365195604 |
| 64-64' | 0 | −0.9 | 0.45325 | 0.444339799 |
| 64-64' | 0.275 | −0.9 | 0.44208 | 0.407507387 |
| 64-64' | 0.55 | −0.9 | 0.40673 | 0.222078134 |
| 64-64' | 0.825 | −0.9 | 0.33975 | −0.26736236 |
| 64-64' | 1.1 | −0.9 | 0.21315 | −1.474768458 |
| 66-66' | −0.825 | −1.35 | 0.25142 | −2.206749161 |
| 66-66' | −0.55 | −1.35 | 0.33647 | −0.466618021 |
| 66-66' | −0.275 | −1.35 | 0.37843 | 0.249697768 |
| 66-66' | 0 | −1.35 | 0.39142 | 0.480120367 |
| 66-66' | 0.275 | −1.35 | 0.37843 | 0.372305835 |
| 66-66' | 0.55 | −1.35 | 0.33647 | −0.188433507 |
| 66-66' | 0.825 | −1.35 | 0.25142 | −1.760534085 |
| 68-68' | −0.55 | −1.8 | 0.20245 | −2.475759875 |
| 68-68' | −0.275 | −1.8 | 0.26644 | −0.172494312 |
| 68-68' | 0 | −1.8 | 0.28458 | 0.52620751 |
| 68-68' | 0.275 | −1.8 | 0.26644 | 0.19213789 |
| 68-68' | 0.55 | −1.8 | 0.20245 | −1.70812945 |

FIGS. 8-14 show an embodiment of the invention where the ellipsoid is truncated. One embodiment of the side view mirror comprises flat portion 110 joined to convex portion 120. The flat portion 110 has a flat portion minor axis 112 and a flat portion major axis 114. The area could simply be described by equation 1 above.

In equation 6, E is the flat portion major axis 114 which extends along the y-axis. In some embodiments, flat portion 110 extends in a manner not described by equation 1 but shown in FIG. 8, FIG. 9 and FIG. 12 with transition portion 116 that provides structural support for convex portion 120. In either case, convex portion 120 extends beyond the y-axis dimension of flat portion 110. The x-axis, the y-axis and the z-axis are labeled for clarity and consistency throughout the specification. However, those of ordinary skill would recognize this labeling as arbitrary and any axis could have any label. In some embodiments, as discussed in more detail below, it may be useful to have saddling transition 118 that transitions from convex portion 120 to flat portion 110.

There is also the convex portion 120 which has a convex portion major axis 122, a convex portion minor axis 124, a convex portion truncated height 126 and an origin point 128, which is provided for reference. Convex portion 120 has its geometric underpinnings in an ellipsoid equation which can be defined by equation 2 above. However, the equation is now subject to the condition that 0<z<0.3

Figure 14:
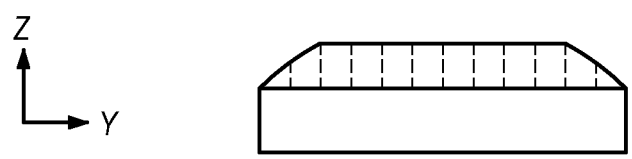
FIG. 14 shows a side view of one embodiment of the present invention.

Here, 2*a is convex portion major axis 122, 2*b is convex portion minor axis 124 and c is a hypothetical convex portion height 126. Hypothetical convex portion height 126 is not realized because the ellipsoid is truncated. In some embodiments, this may serve as an adequate model to design convex surface 120. However, in other models, as shown in FIG. 14, convex portion 120 tapers into flat portion 110. This is accomplished with equation 3 above. The present disclosure explains that Gaussian curvature is what ultimately maximize viewing area while minimizing distortion. Gaussian curvature of these equations is discussed above.

The current invention proposes that one can maximize viewing area while minimizing distortion when a, b, and c are within certain ranges. Two more variables are needed here: the flat portion minor axis 12 is d and the flat portion major axis 14 is e. The following conditions are presented:

$$c>0 \qquad \text{cond. 1}$$

$$a>b+c \qquad \text{cond. 2}$$

$$d>1.5*a \qquad \text{cond. 3}$$

$$2*b>e \qquad \text{cond. 4}$$

There are some preferred ranges:

$$2.125*b<e<2.375*b \qquad \text{range 1}$$

$$1.75*a<d<2.25*a \qquad \text{range 2}$$

$$1.5*a<b<2.0*a \qquad \text{range 3}$$

With those conditions we can now proceed to some examples:

Example 3

Here, the flat portion minor axis 112 is 3.75 inches, the flat portion major axis 114 is 4.00 inches, the convex portion major axis 122 is 4.50 inches, the convex portion minor axis 124 is 2.75 inches, and the convex portion height 126 is 0.500 inches.

Figure 8:
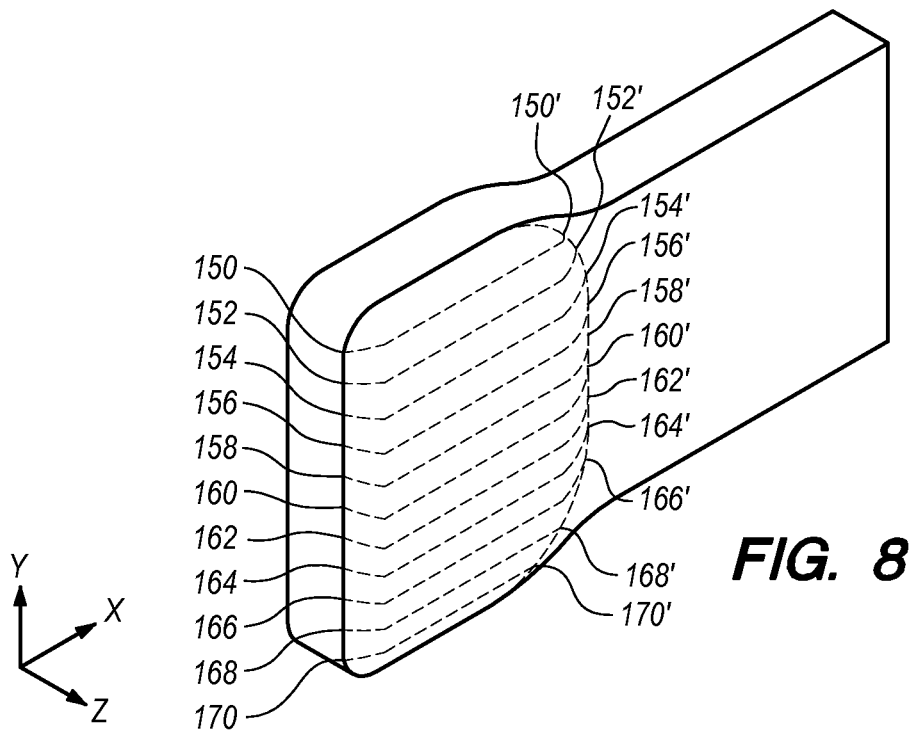
FIG. 8 shows a perspective view of one embodiment of the present invention.

In this example a=1.375 inches, b=2.25 inches and c=0.5 inches d=3.75 inches and e=4.0 inches. In this model, equation 1 is utilized to define the convex portion 120. To show how the convex portion 20 changes with respect to height even measurements are made at regular intervals in the table below as shown:

| chord (as shown in FIG. 8) | x | y | z | Gaussian curvature |
|---|---|---|---|---|
| 152-152' | −0.825 | 1.8 | 0 | 1.382987627 |
| 152-152' | −0.55 | 1.8 | 0.2236068 | 0.135811213 |
| 152-152' | −0.275 | 1.8 | 0.28284271 | 0.068120856 |
| 152-152' | 0 | 1.8 | 0.3 | 0.056579974 |
| 152-152' | 0.275 | 1.8 | 0.28284271 | 0.068120856 |
| 152-152' | 0.55 | 1.8 | 0.2236068 | 0.135811213 |
| 152-152' | 0.825 | 1.8 | 0 | 1.382987627 |
| 154-154' | −1.1 | 1.35 | 0 | 0.827388164 |
| 154-154' | −0.825 | 1.35 | 0.26457513 | 0.072738103 |
| 154-154' | −0.55 | 1.35 | 0.3 | 0.054519921 |
| 154-154' | −0.275 | 1.35 | 0.3 | 0.059130222 |
| 154-154' | 0 | 1.35 | 0.3 | 0.060797574 |
| 154-154' | 0.275 | 1.35 | 0.3 | 0.059130222 |
| 154-154' | 0.55 | 1.35 | 0.3 | 0.054519921 |
| 154-154' | 0.825 | 1.35 | 0.26457513 | 0.072738103 |
| 154-154' | 1.1 | 1.35 | 0 | 0.827388164 |
| 156-156' | −1.1 | 0.9 | 0.2236068 | 0.10139586 |
| 156-156' | −0.825 | 0.9 | 0.3 | 0.050258268 |
| 156-156' | −0.55 | 0.9 | 0.3 | 0.057323116 |
| 156-156' | −0.275 | 0.9 | 0.3 | 0.062301417 |
| 156-156' | 0 | 0.9 | 0.3 | 0.064105689 |
| 156-156' | 0.275 | 0.9 | 0.3 | 0.062301417 |
| 156-156' | 0.55 | 0.9 | 0.3 | 0.057323116 |
| 156-156' | 0.825 | 0.9 | 0.3 | 0.050258268 |
| 156-156' | 1.1 | 0.9 | 0.2236068 | 0.10139586 |
| 158-158' | −1.1 | 0.45 | 0.28284271 | 0.052482805 |
| 158-158' | −0.825 | 0.45 | 0.3 | 0.051723097 |
| 158-158' | −0.55 | 0.45 | 0.3 | 0.059110068 |
| 158-158' | −0.275 | 0.45 | 0.3 | 0.064328142 |
| 158-158' | 0 | 0.45 | 0.3 | 0.066221829 |
| 158-158' | 0.275 | 0.45 | 0.3 | 0.064328142 |
| 158-158' | 0.55 | 0.45 | 0.3 | 0.059110068 |
| 158-158' | 0.825 | 0.45 | 0.3 | 0.051723097 |
| 158-158' | 1.1 | 0.45 | 0.28284271 | 0.052482805 |
| 160-160' | −1.375 | 0 | 0 | 0.496237798 |
| 160-160' | −1.1 | 0 | 0.3 | 0.043889967 |
| 160-160' | −0.825 | 0 | 0.3 | 0.052225628 |
| 160-160' | −0.55 | 0 | 0.3 | 0.059724319 |
| 160-160' | −0.275 | 0 | 0.3 | 0.065025735 |
| 160-160' | 0 | 0 | 0.3 | 0.066950537 |
| 160-160' | 0.275 | 0 | 0.3 | 0.065025735 |
| 160-160' | 0.55 | 0 | 0.3 | 0.059724319 |
| 160-160' | 0.825 | 0 | 0.3 | 0.052225628 |
| 160-160' | 1.1 | 0 | 0.3 | 0.043889967 |
| 160-160' | 1.375 | 0 | 0 | 0.496237798 |
| 162-162' | −1.1 | −0.45 | 0.28284271 | 0.052482805 |
| 162-162' | −0.825 | −0.45 | 0.3 | 0.051723097 |
| 162-162' | −0.55 | −0.45 | 0.3 | 0.059110068 |
| 162-162' | −0.275 | −0.45 | 0.3 | 0.064328142 |
| 162-162' | 0 | −0.45 | 0.3 | 0.066221829 |
| 162-162' | 0.275 | −0.45 | 0.3 | 0.064328142 |
| 162-162' | 0.55 | −0.45 | 0.3 | 0.059110068 |
| 162-162' | 0.825 | −0.45 | 0.3 | 0.051723097 |
| 162-162' | 1.1 | −0.45 | 0.28284271 | 0.052482805 |
| 164-164' | −1.1 | −0.9 | 0.2236068 | 0.10139586 |
| 164-164' | −0.825 | −0.9 | 0.3 | 0.050258268 |
| 164-164' | −0.55 | −0.9 | 0.3 | 0.057323116 |
| 164-164' | −0.275 | −0.9 | 0.3 | 0.062301417 |
| 164-164' | 0 | −0.9 | 0.3 | 0.064105689 |
| 164-164' | 0.275 | −0.9 | 0.3 | 0.062301417 |
| 164-164' | 0.55 | −0.9 | 0.3 | 0.057323116 |
| 164-164' | 0.825 | −0.9 | 0.3 | 0.050258268 |
| 164-164' | 1.1 | −0.9 | 0.2236068 | 0.10139586 |
| 166-166' | −1.1 | −1.35 | 0 | 0.827388164 |
| 166-166' | −0.825 | −1.35 | 0.26457513 | 0.072738103 |
| 166-166' | −0.55 | −1.35 | 0.3 | 0.054519921 |
| 166-166' | −0.275 | −1.35 | 0.3 | 0.059130222 |
| 166-166' | 0 | −1.35 | 0.3 | 0.060797574 |
| 166-166' | 0.275 | −1.35 | 0.3 | 0.059130222 |
| 166-166' | 0.55 | −1.35 | 0.3 | 0.054519921 |
| 166-166' | 0.825 | −1.35 | 0.26457513 | 0.072738103 |
| 166-166' | 1.1 | −1.35 | 0 | 0.827388164 |
| 168-168' | −0.825 | −1.8 | 0 | 1.382987627 |
| 168-168' | −0.55 | −1.8 | 0.2236068 | 0.135811213 |
| 168-168' | −0.275 | −1.8 | 0.28284271 | 0.068120856 |
| 168-168' | 0 | −1.8 | 0.3 | 0.056579974 |
| 168-168' | 0.275 | −1.8 | 0.28284271 | 0.068120856 |
| 168-168' | 0.55 | −1.8 | 0.2236068 | 0.135811213 |
| 168-168' | 0.825 | −1.8 | 0 | 1.382987627 |

Figure 9:
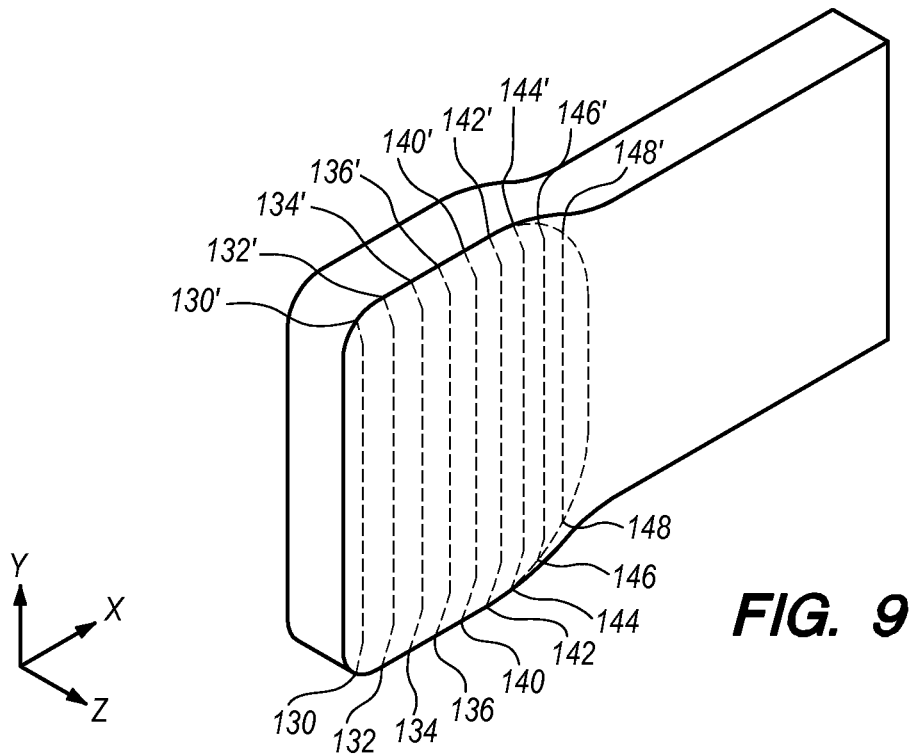
FIG. 9 shows a perspective view of one embodiment of the present invention.
Figure 10:
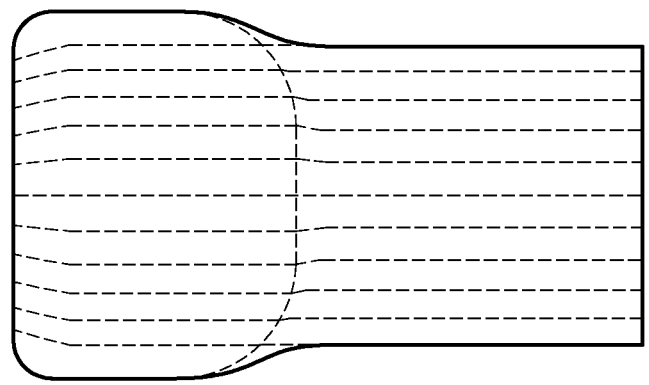
FIG. 10 shows a front view of one embodiment of the present invention.
Figure 11:
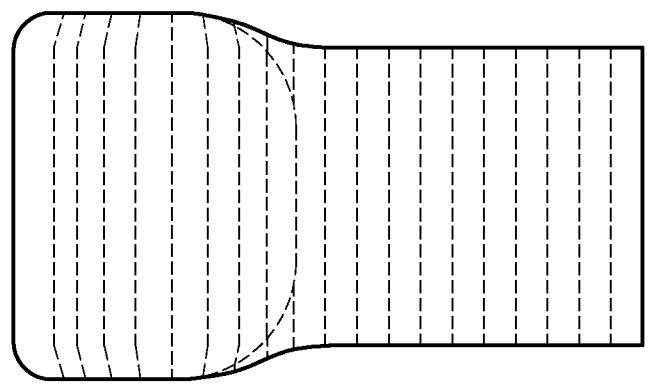
FIG. 11 shows a front view of one embodiment of the present invention.
Figure 12:
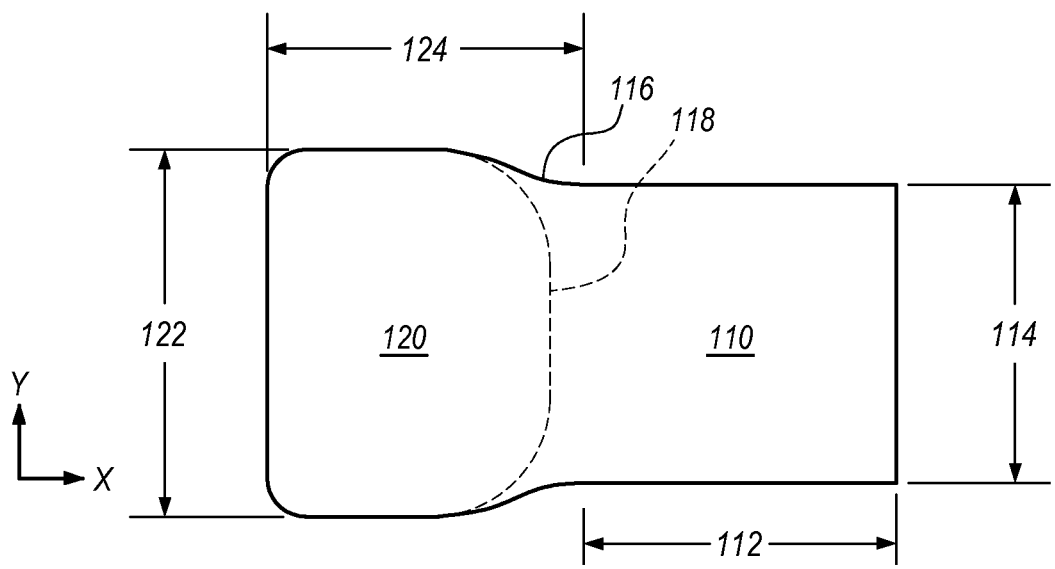
FIG. 12 shows a front view of one embodiment of the present invention.
Figure 13:
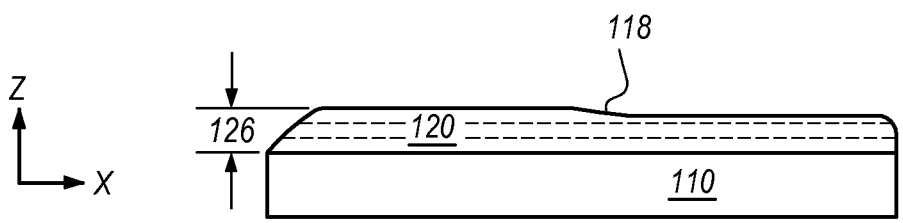
FIG. 13 shows a top view of one embodiment of the present invention.

Likewise, measurements can be taken in regular intervals in the x-direction with chords as shown in FIG. 9:

| chord (as shown in FIG. 9) | x | y | z | Gaussian curvature |
|---|---|---|---|---|
| 140-140' | 0 | −1.8 | 0.3 | 0.056579974 |
| 140-140' | 0 | −1.35 | 0.3 | 0.060797574 |
| 140-140' | 0 | −0.9 | 0.3 | 0.064105689 |
| 140-140' | 0 | −0.45 | 0.3 | 0.066221829 |
| 140-140' | 0 | 0 | 0.3 | 0.066950537 |
| 140-140' | 0 | 0.45 | 0.3 | 0.066221829 |
| 140-140' | 0 | 0.9 | 0.3 | 0.064105689 |
| 140-140' | 0 | 1.35 | 0.3 | 0.060797574 |
| 140-140' | 0 | 1.8 | 0.3 | 0.056579974 |
| 140-140' | 0 | 2.25 | 0 | 3.55802603 |
| 130-130' | −1.1 | −0.9 | 0.22361 | 0.10139586 |
| 130-130' | −1.1 | −0.45 | 0.28284 | 0.052482805 |
| 130-130' | −1.1 | 0 | 0.3 | 0.043889967 |
| 130-130' | −1.1 | 0.45 | 0.28284 | 0.052482805 |
| 130-130' | −1.1 | 0.9 | 0.22361 | 0.10139586 |
| 130-130' | −1.1 | 1.35 | 0 | 0.827388164 |
| 132-132' | −0.825 | −1.35 | 0.26458 | 0.072738103 |
| 132-132' | −0.825 | −0.9 | 0.3 | 0.050258268 |
| 132-132' | −0.825 | −0.45 | 0.3 | 0.051723097 |
| 132-132' | −0.825 | 0 | 0.3 | 0.052225628 |
| 132-132' | −0.825 | 0.45 | 0.3 | 0.051723097 |
| 132-132' | −0.825 | 0.9 | 0.3 | 0.050258268 |
| 132-132' | −0.825 | 1.35 | 0.26458 | 0.072738103 |
| 134-134' | −0.55 | −1.8 | 0.22361 | 0.135811213 |
| 134-134' | −0.55 | −1.35 | 0.3 | 0.054519921 |
| 134-134' | −0.55 | −0.9 | 0.3 | 0.057323116 |
| 134-134' | −0.55 | −0.45 | 0.3 | 0.059110068 |
| 134-134' | −0.55 | 0 | 0.3 | 0.059724319 |
| 134-134' | −0.55 | 0.45 | 0.3 | 0.059110068 |
| 134-134' | −0.55 | 0.9 | 0.3 | 0.057323116 |
| 134-134' | −0.55 | 1.35 | 0.3 | 0.054519921 |
| 134-134' | −0.55 | 1.8 | 0.22361 | 0.135811213 |
| 136-136' | −0.275 | −1.8 | 0.28284 | 0.068120856 |
| 136-136' | −0.275 | −1.35 | 0.3 | 0.059130222 |
| 136-136' | −0.275 | −0.9 | 0.3 | 0.062301417 |
| 136-136' | −0.275 | −0.45 | 0.3 | 0.064328142 |
| 136-136' | −0.275 | 0 | 0.3 | 0.065025735 |
| 136-136' | −0.275 | 0.45 | 0.3 | 0.064328142 |
| 136-136' | −0.275 | 0.9 | 0.3 | 0.062301417 |
| 136-136' | −0.275 | 1.35 | 0.3 | 0.059130222 |
| 136-136' | −0.275 | 1.8 | 0.28284 | 0.068120856 |
| 142-142' | 0.275 | −1.8 | 0.28284 | 0.068120856 |
| 142-142' | 0.275 | −1.35 | 0.3 | 0.059130222 |
| 142-142' | 0.275 | −0.9 | 0.3 | 0.062301417 |
| 142-142' | 0.275 | −0.45 | 0.3 | 0.064328142 |
| 142-142' | 0.275 | 0 | 0.3 | 0.065025735 |
| 142-142' | 0.275 | 0.45 | 0.3 | 0.064328142 |
| 142-142' | 0.275 | 0.9 | 0.3 | 0.062301417 |
| 142-142' | 0.275 | 1.35 | 0.3 | 0.059130222 |
| 142-142' | 0.275 | 1.8 | 0.28284 | 0.068120856 |
| 144-144' | 0.55 | −1.8 | 0.22361 | 0.135811213 |
| 144-144' | 0.55 | −1.35 | 0.3 | 0.054519921 |
| 144-144' | 0.55 | −0.9 | 0.3 | 0.057323116 |
| 144-144' | 0.55 | −0.45 | 0.3 | 0.059110068 |
| 144-144' | 0.55 | 0 | 0.3 | 0.059724319 |
| 144-144' | 0.55 | 0.45 | 0.3 | 0.059110068 |
| 144-144' | 0.55 | 0.9 | 0.3 | 0.057323116 |
| 144-144' | 0.55 | 1.35 | 0.3 | 0.054519921 |
| 144-144' | 0.55 | 1.8 | 0.22361 | 0.135811213 |
| 146-146' | 0.825 | −1.35 | 0.26458 | 0.072738103 |
| 146-146' | 0.825 | −0.9 | 0.3 | 0.050258268 |
| 146-146' | 0.825 | −0.45 | 0.3 | 0.051723097 |
| 146-146' | 0.825 | 0 | 0.3 | 0.052225628 |
| 146-146' | 0.825 | 0.45 | 0.3 | 0.051723097 |
| 146-146' | 0.825 | 0.9 | 0.3 | 0.050258268 |
| 146-146' | 0.825 | 1.35 | 0.26458 | 0.072738103 |
| 146-146' | 0.825 | 1.8 | 0 | 1.382987627 |
| 148-148' | 1.1 | −0.9 | 0.22361 | 0.10139586 |
| 148-148' | 1.1 | −0.45 | 0.28284 | 0.052482805 |
| 148-148' | 1.1 | 0 | 0.3 | 0.043889967 |
| 148-148' | 1.1 | 0.45 | 0.28284 | 0.052482805 |
| 148-148' | 1.1 | 0.9 | 0.22361 | 0.10139586 |
| 148-148' | 1.1 | 1.35 | 0 | 0.827388164 |

In example 3, the convex portion height is truncated creating a second flat surface.

Any element in a claim that does not explicitly state "means for" performing a specified function, or "step for" performing a specified function, is not to be interpreted as a "means" or "step" clause as specified in 35 U.S.C. § 112, § 6. In particular, any use of "step of" in the claims is not intended to invoke the provision of 35 U.S.C. § 112, § 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A side view mirror for an automobile, configured to maximize viewing area and minimize image distortion; the side view mirror comprising:
   a flat portion, having a flat portion major axis, a flat portion minor axis and a flat portion height, a flat portion upper boundary and a flat portion lower boundary spanning a flat portion y-axis dimension from a flat portion first edge; wherein the a flat portion upper boundary and the flat portion lower boundary are perpendicular to the flat portion first edge;
   a transition portion, extending distally from the flat portion opposite the flat portion first edge; wherein the transition portion extends outward from the flat portion y-axis dimension while extending continuously away from the flat portion first edge;
   a convex portion, smoothly joined to the flat portion with the transition portion, the convex portion having an ellipsoid shape; wherein the convex portion extends beyond the y-axis dimension both above the flat portion upper boundary and below the flat portion lower boundary, extending beyond distal points of the flat portion and having a convex portion major axis, a convex portion minor axis, a convex portion height; wherein the convex portion is configured to be defined around an origin point.

2. The side view mirror of claim 1, wherein every point on the convex portion has a Gaussian curvature that is greater than zero.

3. The side view mirror of claim 1, wherein the convex portion has some points with a Gaussian curvature that is greater than zero and some points with the Gaussian curvature that is less than zero causing a saddling effect on the convex portion.

4. The side view mirror of claim 1, wherein the convex portion height is greater than zero.

5. The side view mirror of claim 4, wherein the convex portion major axis is greater than twice the convex portion minor axis plus the convex portion height.

6. The side view mirror of claim 5, wherein the flat portion minor axis is greater than three quarters the flat portion major axis.

7. The side view mirror of claim 6, wherein the flat portion major axis is greater than the convex portion minor axis.

8. The side view mirror of claim 4, wherein the convex portion height is truncated creating a second flat surface.

9. The side view mirror of claim 1, wherein the convex portion is defined by an ellipsoid equation:

$$\frac{z^2}{c^2} + \frac{\left(x - \frac{c}{10}\right)^2}{a^2} + \frac{y^2}{b^2} = 1$$

wherein a is half the convex portion minor axis; b is half the convex portion major axis; c is the convex portion height; and wherein wherein a is greater than the sum of b and c; wherein c is greater than zero.

* * * * *